United States Patent
Hennig et al.

[11] Patent Number: 6,003,951
[45] Date of Patent: Dec. 21, 1999

[54] BELT FIXTURE FOR A SAFETY BELT

[75] Inventors: Herbert Hennig, Munich; Ingo Schmiedel, Altomuenster, both of Germany

[73] Assignee: Bayerische Motoren Werke Aktiengesellschaft, Germany

[21] Appl. No.: 09/077,188
[22] PCT Filed: Aug. 27, 1996
[86] PCT No.: PCT/EP96/03765
    § 371 Date: Nov. 23, 1998
    § 102(e) Date: Nov. 23, 1998
[87] PCT Pub. No.: WO97/19836
    PCT Pub. Date: Jun. 5, 1997

[30] Foreign Application Priority Data

Nov. 25, 1995 [DE] Germany .......................... 195 43 996

[51] Int. Cl.⁶ .................................................. B60R 22/00
[52] U.S. Cl. .......................... 297/483; 297/472; 280/808
[58] Field of Search .................. 297/483, 216.1, 297/472; 280/808

[56] References Cited

U.S. PATENT DOCUMENTS

| 4,222,609 | 9/1980 | Andersson . |
| 4,789,186 | 12/1988 | Andersson .......................... 297/483 X |
| 5,372,382 | 12/1994 | Whitens .................................. 280/808 |

FOREIGN PATENT DOCUMENTS

| 32 00 118 A1 | 1/1982 | Germany . |
| 27 26 683 A1 | 11/1995 | Germany . |

*Primary Examiner*—Anthony D. Barfield
*Attorney, Agent, or Firm*—Evenson McKeown; Edwards & Lenahan P.L.L.C.

[57] ABSTRACT

A steering fixture for a seat belt in a vehicle, especially a motor vehicle, is pivotable during its normal use within a certain angle range. The pivotability is limited by a predetermined breaking point. If the steering fixture is subjected to a particular load, the connection breaks and the steering fixture can turn freely.

6 Claims, 1 Drawing Sheet

BELT FIXTURE FOR A SAFETY BELT

BACKGROUND AND SUMMARY OF THE INVENTION

This application claims the priority of German application 195 43 996.1 and PCT/EP96/03765, filed Nov. 25, 1995 and Aug. 26, 1996, respectively, the disclosures of which are expressly incorporated by reference herein.

The present invention relates to a steering fixture for a seat belt in a vehicle, especially a motor vehicle through which the belt passes in a guide slot and which is pivotably mounted to a portion of the vehicle integral with the body approximately at the level of a vehicle occupant's shoulder.

The seat belts used today in vehicles, as a rule, consist of a single belt formed by steering devices into a shoulder belt portion that runs diagonally across the upper body of the vehicle occupant and a lap belt section. The shoulder belt section is usually guided at its upper end through a steering fixture mounted on the vehicle body and runs downward from there to a belt retractor.

In order to adapt to the various body sizes of individual vehicle occupants, the steering fixture is pivotable relative to the vehicle body. There is, however, a disadvantage associated with unimpeded pivotability and rotatability of the steering fixture. When a load is applied, the belt is forced into a corner area of the feed-through slot and has a tendency to tear as a result.

An effort is therefore being made, on one hand, to limit the pivotability of the steering fixture. On the other hand, however, unlimited pivotability is desirable in certain load cases.

An object of the present invention is to provide a steering fixture such that it both prevents shifting of the belt into a corner area of the guide slot of the steering fixture and can also pivot unimpeded when a specific loads are applied.

The foregoing object has been achieved according to the present invention by providing a steering fixture held by a predetermined breaking point connection in a predetermined position which permits limited pivoting fashion.

According to the invention, the predetermined breaking point confers a certain degree of pivotability on the steering fixture. As a result, the path of the belt adapts to the specific size of the vehicle occupant. When the abovementioned loads develop, the connection breaks and the steering fixture can advantageously pivot freely.

The predetermined break location can be provided most simply by using a shear pin provided on the steering fixture. The portion of the pin advantageously fits into a receiving opening of the mounting portion on the body. In a preferred embodiment, this receiving opening is made in the form of an elongated hole in the shape of a circular arc.

The present invention makes it possible with an advantageous configuration to use a known steering fixture. For this purpose, a shell-like receiving part is placed on the steering fixture and is bolted thereto. The shear pin is formed integrally on the receiving part. In addition, it is advantageous to make the receiving part of plastic material.

BRIEF DESCRIPTION OF THE DRAWING

Other objects, advantages and novel features of the present invention will become apparent from the following detailed description of the invention when considered in conjunction with the accompanying sole FIG. wherein:

The sole FIG. is an exploded perspective view of a mounting location of a steering feature of a conventional motor vehicle.

DETAILED DESCRIPTION OF THE DRAWING

Figure 1:
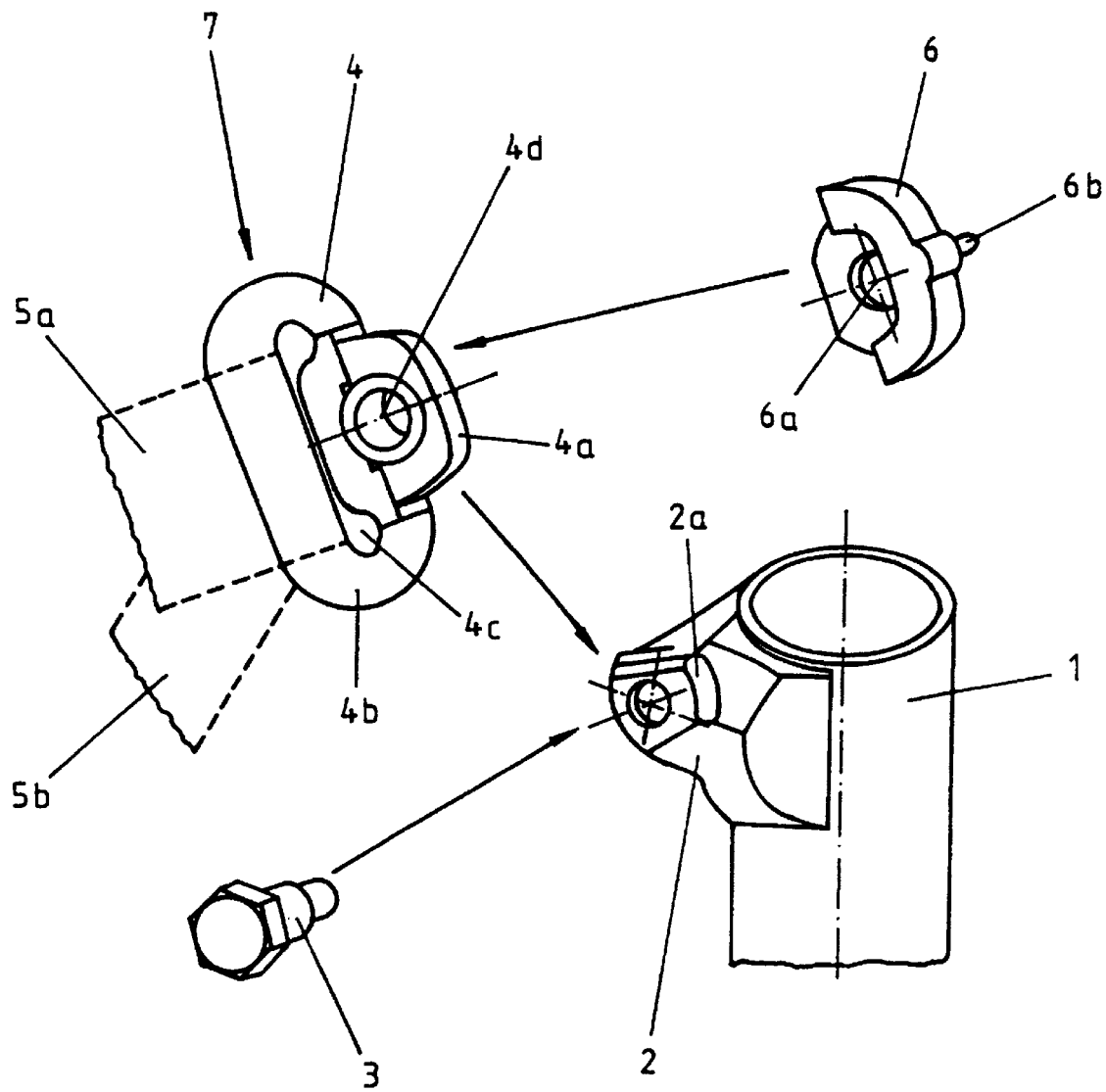

In the single FIG., the mounting location of a steering fixture 4 of a conventional three-point seat belt system in a motor vehicle is shown. Steering fixture 4 is located at the level of the shoulder of a vehicle occupant, not shown, on the vehicle body. The drawing shows a tube which symbolizes the vehicle body. However, it should be pointed out that the seat back, of a vehicle seat for example, can also be considered as belonging to the vehicle body in the sense of the present invention.

A mounting eye is formed on the tube 1, to which eye a seat belt indicated by 5a, 5b can be bolted by a mounting bolt 3. Steering fixture 4 consists of a mounting section 4a with a through hole 4d for mounting bolt 3. Mounting section 4a is abutted by a section 4b with a guide slot 4c, through which the belt is guided. Belt section 5a thus forms a shoulder belt section (not shown) which runs diagonally across the upper body of the vehicle occupant, while the belt section 5b runs downward to a retractor located in the vicinity of the vehicle floor.

Before being bolted in place, a receiving part 6 is placed on the mounting section 4a of the steering fixture 4. The part 6 has a threaded hole 6a that is flush with the through hole 4d of the steering fixture 4. The receiving part 6 also has a shear pin 6b on its side that faces the mounting eye 2.

The parts so arranged are bolted to the mounting eye 2, but in such fashion that steering fixture 4 with its receiving part 6 is still free to rotate as before around the bolt axis. When the bolt is tightened, however, the shear pin 6b engages a receiving opening 2a in the form of an elongated hole in the shape of a circular arc. The hole 2a is located at a distance from the mounting bolt 3, and the center of the circle coincides with the bolt axis. The dimensions of the shear pin 6b and the hole 2a are chosen so that shear pin 6b can move freely in the opening 2a. The rotary movement is also limited by the length of the receiving opening 2a.

In this manner, assurance is provided that under a normal load, in other words when forces act on the belt 5a as a result of the vehicle occupant being displaced forward, the belt does not slip into a corner area of guide slot 4c. On the other hand, if the steering fixture 4 is subjected to a force like that indicated for example by arrow 7, the shear pin 6b will break or shear, and the steering fixture 4 will be able to rotate freely downward.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Steering fixture for a seat belt in a vehicle body, comprising a component having guide slot configured to allow the seat belt to pass through, means for pivotable mounting of the component with the vehicle body approximately at a level of a vehicle occupant's shoulder, and means for providing a predetermined breaking point connection between the component and the vehicle body in a predetermined position which permits only a limited freedom to pivot below a predetermined force.

2. Steering fixture according to claim 1, wherein the pivotable mounting means comprises a mounting bolt to allow the steering fixture to turn freely around a bolt axis, and the means for providing a predetermined breaking point connection comprises a shear pin spaced apart from the mounting bolt, said shear pin engaging a receiving opening of a mounting section on a body side which limits rotary movement of the steering fixture.

3. Steering fixture according to claim 2, wherein a separate shell-like receiving part is secured in position by the mounting bolt and has the shear pin integrally formed thereon the receiving part being configured to have the steering fixture, at least in a mounting section area thereof, inserted into the receiving part.

4. Steering fixture according to claim 3, wherein the receiving part, the shear pin is a plastic part.

5. Steering fixture according to claim 2, wherein the shear pin is arranged to engage in the receiving opening having a circular arc shape and spaced from the bolt axis.

6. Steering fixture according to claim 1, wherein the pivotable mounting means is located symmetrically with respect to the component.

* * * * *